United States Patent [19]

Fay

[11] Patent Number: 4,513,656
[45] Date of Patent: Apr. 30, 1985

[54] SANDWICH MACHINE

[76] Inventor: Rudolph J. Fay, 6911 Wildflower Trail, Cincinnati, Ohio 45230

[21] Appl. No.: 508,861

[22] Filed: Jun. 29, 1983

[51] Int. Cl.³ .............................................. A21C 9/04
[52] U.S. Cl. ................................... 99/450.4; 99/450.7
[58] Field of Search ................. 99/450.1, 450.2, 450.4, 99/450.5, 450.7; 426/274, 524

[56] References Cited

U.S. PATENT DOCUMENTS

| | | | |
|---|---|---|---|
| 3,783,772 | 1/1974 | Fay | 99/450.4 |
| 4,329,920 | 5/1982 | Rose et al. | 99/450.4 |

*Primary Examiner*—Timothy F. Simone
*Attorney, Agent, or Firm*—Wood, Herron & Evans

[57] ABSTRACT

A machine for receiving multiple columns of bakery products such as cookies from an oven and for forming those products into sandwiches having a middle ply or layer of topping material such as jelly or icing. The machine comprises a row of magazines and a feeder mechanism operable to sequentially feed rows of cookies from the row of magazines onto a main conveyor. While transported on the main conveyor, topping is applied to alternate rows of cookies. The alternate untopped rows of cookies are inverted, and then layered onto the topped rows. The machine is characterized by a waste topping transfer belt located beneath the main conveyor, a synchronizing conveyor operable to synchronize movement of topped rows of cookies with untopped and inverted rows while the inverted and untopped cookies are placed atop the topped rows, a reciprocating platen to size the final product, and a two stage cooling systems to cool and rigidify the cookies before they are fed into the magazines.

28 Claims, 5 Drawing Figures

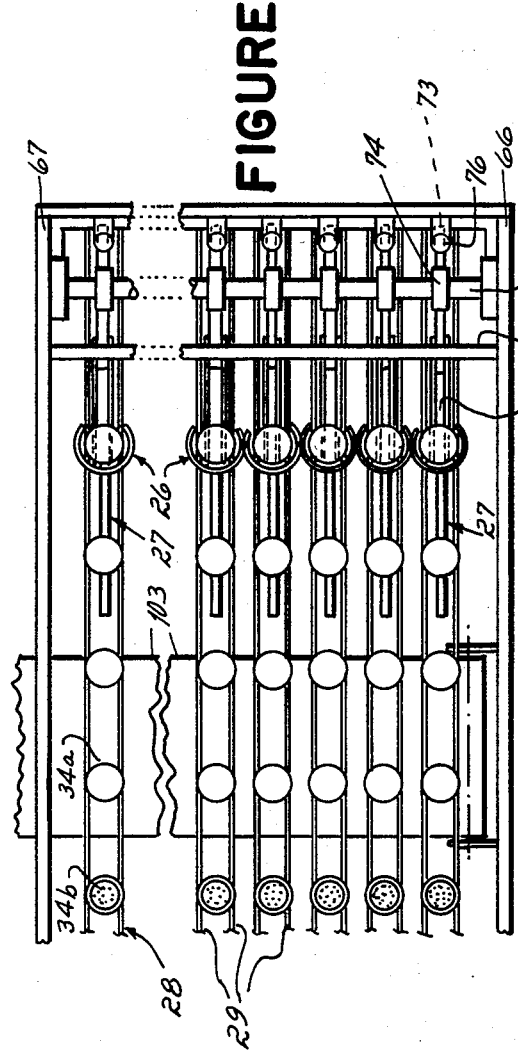
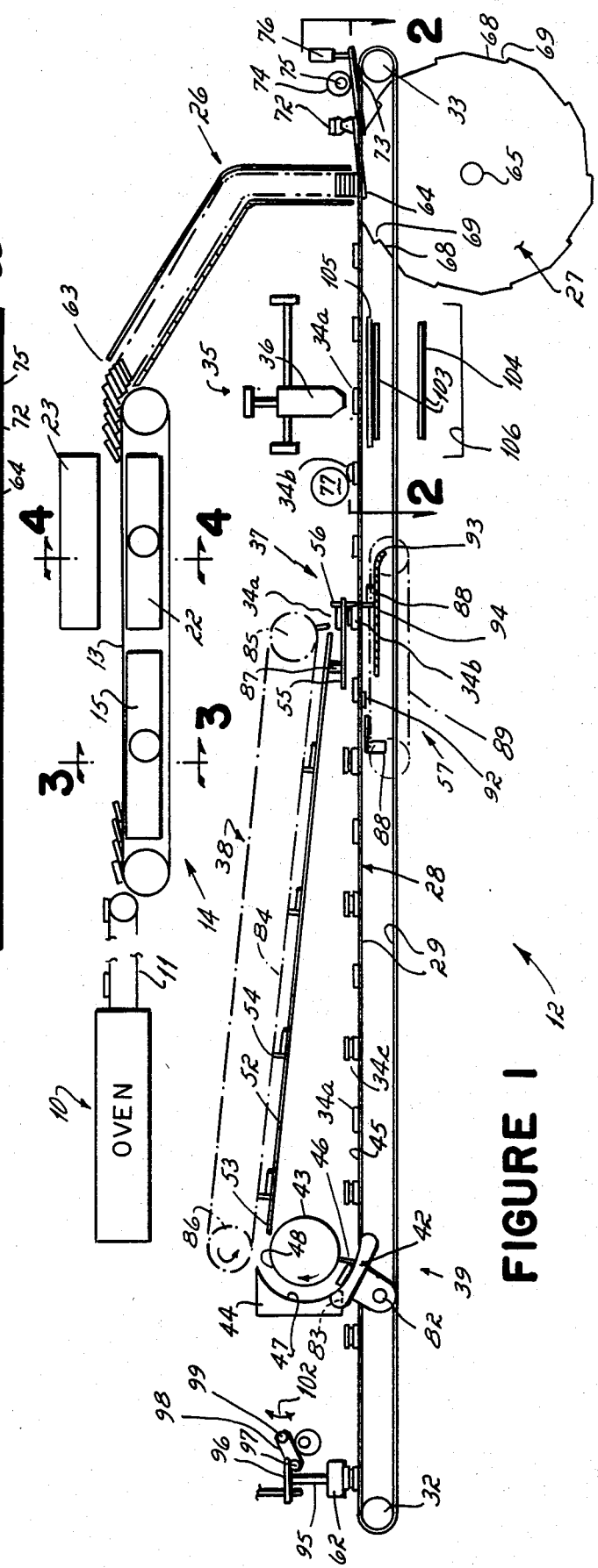

1

SANDWICH MACHINE

BACKGROUND OF THE INVENTION

This invention relates to cookie or cake topping machines, and particularly to machines for both topping and layering baked objects so as to make sandwiches of them.

In my earlier U.S. Pat. No. 3,783,772 I disclosed a sandwich making machine which was operable to accept cookie or dough products from an oven and to form those cookie or dough products into a sandwich without the need for any intermediate manual handling of the cookies between the oven and the sandwich making machine. This invention is in the nature of an improvement upon the sandwich machine disclosed in the above identified U.S. Pat. No. 3,783,772.

The sandwich making machine disclosed in the above identified U.S. Pat. No. 3,783,772 is operable to receive columns of cookies or bakery products in irregularly spaced and misaligned rows and to automatically align those rows, apply topping to alternate ones of the rows, and layer the alternate untopped rows onto the topped rows. The machine comprises a reciprocating feeder bar operable upon detection of a predetermined weight of objects at the infeed station to push the objects forwardly onto a continuously moving endless belt conveyor. Simultaneously, with the actuation of the pusher bar a memory circuit is actuated to record the position of the objects on the conveyor. This memory circuit then controls the application of the topping to alternate rows of objects and subsequent pick-up, inversion and layering of untopped rows of objects onto topped rows.

It has been found that the use of a pusher bar operable upon detection of a predetermined weight of objects at the infeed station to initiate cycling of the machine and the use of a memory circuit actuated upon initiation of the movement of the pusher bar for controlling subsequent operation of the machine, is unnecessarily complex and expensive. It has therefore been one objective of this invention to provide an improved feed system for feeding bakery products into a sandwich machine without the need for manual labor to gently place the bakery products into a magazine, and without the need for a complex memory circuit to control operation of the machine.

This objective is accomplished by the feed mechanism of this invention wherein the dough products are fed into a magazine from which the lowermost one of a stack of dough products are sequentially fed into the machine. If the products are particularly fragile or are to be coated with a product such as chocolate which requires chilling before the product may be handled, the products are passed through a cooling tunnel and rigidified before they are fed into the magazine. By passing the products through a cooling tunnel before they are stacked in the magazine, breakage or chipping of the dough products is minimized in the course of being fed into and from the magazine. Additionally, cooling the product to a temperature substantially below that of the room before the product is fed into the magazine has an additional benefit. The baked product will remain cool when it is fed through the sandwich machine. When the filling or topping material is applied to the lowermost cake or bakery product, regardless of the consistency of the filling material, the cap or topmost baked object may be placed on top of the unit and the unit compressed because the BTU content of the filling material is immediately absorbed into the refrigerated or cooled dough product as soon as the material is placed on the lowermost baked product. Consequently, the completed sandwich will withstand handling without the need for further cooling before it may be mechanically handled and packaged.

Additionally, the addition of the refrigerating or cooling tunnel upstream of the magazine has the advantage that it enables soft bakery products, such as oatmeal cookies, which could never heretofore be fed from a magazine, to be so fed into the machine.

Still another advantage of the use of a cooling tunnel upstream of the magazine of the sandwich machine is that it enables the sandwich product to be coated with chocolate or other types of coating with much greater facility. Prior to this invention it has been common practice to coat sandwich products with chocolate or other coatings and after coating to pass the coated product through a long cooling tunnel before the product could be mechanically handled. With the invention of this application the coated sandwich product is quickly chilled and set up because of the use of a chilled or cold bakery product to which the chocolate or coating material is applied.

Another problem with the sandwich machine disclosed in the above identified U.S. Pat. No. 3,783,772, upon which this invention is an improvement, is that of disposing of and cleaning up waste topping material which either misses a target bakery product when the topping material is dispensed onto a target product, or which is dispensed when there is no bakery product beneath the dispenser. In that event the topping material, which may be marshmallow or other similarly sticky material, falls onto the conveyor or onto the machine beneath the conveyor and become a clean-up problem.

It has therefore been another objective of this invention to facilitate clean-up of waste topping material which is ejected from the dispenser but which does not fall onto a target baked product. To that end the invention of this application incorporates a transverse waste topping belt movable in a path transverse to the direction of movement of bakery products through the sandwich machine and located beneath the topping dispenser. The main conveyor upon which the bakery products are conveyed past the dispenser comprises a pair of spaced belts operable to transport each column of bakery product. Beneath these spaced belts is the transversely extending continuously rotating waste topping belt conveyor. Any topping material which is dispensed from the topping dispenser and which misses a target bakery product, passes between these belts of the main conveyor onto the top of the transverse belt waste take-off conveyor and is transported to a waste topping material reservoir located at one end of the conveyor. At this one end there is a wiper operable to wipe the waste topping material from the belt and move it into the waste reservoir.

Still another problem encountered with the machine disclosed in the above identified U.S. Pat. No. 3,783,772 was that of maintaining alignment of the topmost cookie when it was placed upon the lower topped cookies to form the sandwich. In the prior art machine disclosed in this patent, a pusher plate pushed the upper or topmost row of objects off of a deadplate as the lower topped row moved beneath the deadplate. Alignment of the top and bottom cookies was dependent upon synchronization of the pusher plate with the movement of the conveyor so that the two rows were perfectly aligned when the top row was moved onto the top of the lower row. Occasionally, if the pusher plate was slightly out of synchronization with the movement of the conveyor, the top and bottom layers of the sandwich were misaligned.

It has therefore been another objective of this invention to improve the alignment of top and bottom layers of the sandwiches produced on the machine such that the tops always move off of a supporting deadplate and onto the lower bottom cookie when the tops and bottoms are vertically aligned. To that end the invention of this application utilizes a conveyorized pusher finger operative to simultaneously move the lowermost topped cookie or object forwardly on its supporting conveyor while pushing the topmost layer off of a deadplate. Thereby, the two layers of the sandwich are caused to be perfectly aligned when the top layer is pushed off of the deadplate onto the lower bottom layer.

Still another problem encountered with the machine disclosed in the above identified U.S. Pat. No. 3,783,772 was that of the sandwich being generally wedge-shaped—lower at the front and higher at the back—when it emerged from the machine disclosed in this patent. This prior art machine sized the completed sandwich by passing it beneath a sizing roller.

It has therefore been another objective of this invention to provide a sandwich machine in which the final product is sized such that the leading and trailing edges are of the same height rather than having the leading edge lower than the trailing edge. To that end the machine of this application incorporates a reciprocal presser plate operable to place a predetermined weight on the top of each sandwich before the sandwich leaves the machine and thereby to eliminate the wedge-shaped configuration characteristic of cookies made on the machine of the above identified patent.

Still another problem characteristic of the machine identified in the above identified U.S. Pat. No. 3,783,772 was that of an inability to stop the infeed of cookies or objects into the machine if it was desired to run the machine dry of product or to infeed alternate rows of cookies at start-up for filling of the upper layer conveyor of the machine.

It has therefore been another objective of this invention to provide a machine which is capable of either running the machine dry while preventing the infeed of cookies or capable of infeeding cookies to alternate rows sites on the infeed conveyor. To that end the invention of this application incorporates lifter fingers movable in synchronization with a pusher feed wheel to lift cookies in the feed magazines each time the bottommost cookie or product is removed from the magazine. If the feed is to be stopped momentarily, as for example to run the machine dry by feeding all of the products in the machine through without any further infeed, these fingers are operative to hold the cookies in the feed magazine in an upward position out of alignment with the pusher feed wheel so that they cannot be contacted and fed out of the magazine by the feed wheel.

These and other objects and advantages of this invention will be more readily apparent from the following description of the drawings in which:

FIG. 1 is a partially diagrammatic cross sectional view through the sandwich machine incorporating the invention of this application.

FIG. 2 is a top plan view taken on line 2—2 of FIG. 1.

Figure 3:
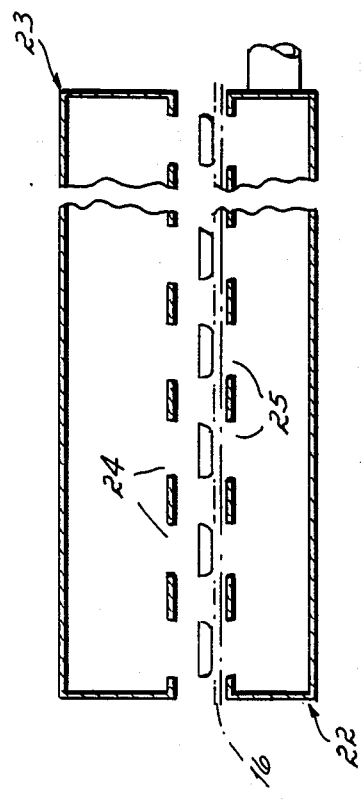
FIG. 3 is a cross-sectional view taken on line 3—3 of FIG. 1.

The machine 10 illustrated in FIGS. 1-4 is adapted to receive rows of cookies or cakes or other baked objects from a bakery oven 10 and infeed conveyor 11 and to form those rows of cookies into sandwiches. This machine is particularly suited to the automatic manufacture of sandwich type cookies such as sandwiches of the type having marshmallow or peanut butter or similar topping material in the middle of the sandwich.

In most modern bakeries the baked products are automatically conveyed into and out of the bakery ovens. The machine depicted in FIGS. 1-4 is operable to automatically and without any manual handling accept the rows of cookies from the baking oven 10 and feed them into and through the sandwich machine 12.

As cookies or baked products emerge from a commercial bakery oven, they are arranged on columns and rows supported upon a conveyor 11. According to the practice of this invention, cookies from the conveyor 11 are moved onto a slower moving shingling conveyor 13 wherein the cookies of each column are shingled such that each cookie partially overlaps the one preceding it. After having been shingled, the cookies are transported upon the shingling conveyor 13 through a two stage cooling system 14. This two stage cooling system 14 comprises a first plenum 15 located beneath the top run of the conveyor 13 and operative to draw air at room temperature down over the shingled cookies and through the wire mesh 16 of the conveyor 13. The chamber of the plenum 15 is connected to a conventional fan or blower operative to pull air from above the plenum and discharge it from the bottom. As can be seen with reference to FIG. 3, the top 17 of the plenum 15 is open immediately beneath the columns of shingled cookies, but the open top is partially closed by spaced longitudinal straps 18 of the top wall 19 of the plenum 15. These straps 18 are located immediately beneath the space 19 between the columns of shingled cookies. Consequently, room temperature air entering the plenum 15 passes over the shingled cookies and effectively cools the shingled cookies to a surface temperature of approximately 80° F. to 100° F. from a temperature of approximately 180° F. at which they emerge from the oven 10.

Figure 4:
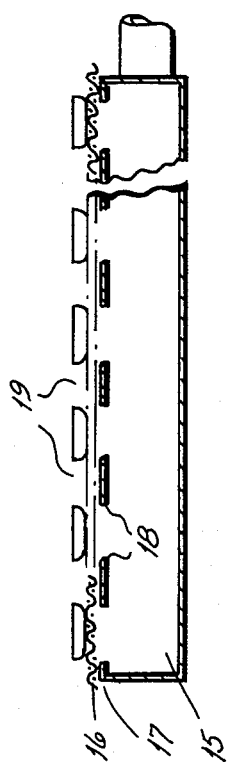
FIG. 4 is a cross-sectional view taken on line 4—4 of FIG. 1.

Referring now to FIGS. 1 and 4, it will be seen that the second stage of the cooling system comprises two plenums 22 and 23 respectively located beneath and above the top row of the conveyor 13 downstream of the first stage plenum 15. These two plenums 22, 23 are operative to circulate refrigerated air through the columns of shingled cookies. Cold or refrigerated air, at or near 32° F. is pulled from the upper plenum 23, the bottom of which is closed except for longitudinal slotted areas 24 over the columns of cookies on the conveyor 13, downwardly into the lower plenum 22. The top of the lower plenum 22 is closed except for longitudinal slots 25 located beneath the columns of shingled cookies. The refrigerated air is recirculated (by ducts not shown) from the lower plenum 22 back to the upper plenum 23 via an air cooler. All of the refrigerated air flowing between the two plenums thus passes over the shingled cookies and cools the cookies to a surface temperature at or near 32° F.

From the shingling conveyor 13 the rows of cookies move into a row of vertical feed magazines 26, one column of cookies from conveyor 13 feeding each one of the magazines 26. Cookies are fed from the bottom of these feed magazines at a predetermined feed rate by feed wheels 27 operative to remove the lowermost cookie in the magazines 26 and place those cookies upon an infeed or main conveyor 28. On the infeed conveyor the cookies are spaced a predetermined distance apart, which distance is a function of the speed of rotation of the feed wheel 27 relative to the linear speed of the infeed conveyor 28.

The infeed conveyor 28 of the machine 12 comprises a plurality of parallel running endless belts 29. Together these endless belts 29, which in a preferred embodiment are spaced approximately one inch apart, form a single main feed conveyor 28 which stretches from a drive roller 32 at the forward end of the machine to and around an idler roller 33 at the rear or infeed end of the machine. The conveyor 28 is continuously movable and is mechanically tied to all other movable conveyors, feed wheels, compressor plates, etc. of the machine so that they all move in synchronization, as is explained more fully hereinafter.

In the course of moving forward on the infeed conveyor 28, every other row 34b of cookies 34 receives topping, as for example, marshmallow topping or peanut butter topping or other conventional icing-like topping, at a topping station 35. As the alternate rows 34b pass beneath a topping head 36 at the topping station 35, the topping head moves forwardly with the rows 34b while a valve in the bottom of the head opens and the topping material is ejected through nozzles onto tops of the cookies 34 in the row 34b. The machine is so cycled that only alternate rows 34b of cookies receive the topping. The other rows 34a pass through the topping station 35 without having topping applied thereto.

The untopped rows 34a of cookies pass through the layering or sandwich making station 37 of the machine without stopping and without having anything done to them. They continue to move forwardly on the machine until they arrive at a pickup and inversion station 39 near the end of the machine. At station 39, the untopped rows of cookies 34a are picked up and inverted in preparation for being returned via a return conveyor 38 to the layering or sandwich station 37. Inversion of the untopped rows 34a of cookies occurs simultaneously with pickup of the cookies and transport to the return conveyor 38. To effect the inversion and the movement to the return conveyor 38, there is a lifter cam 42, a pinwheel 43, and a guide cam 44 located at the pickup and inversion station 39 at the front or downstream end of the machine. The lifter cam 42 is located beneath the upper run 45 of the main conveyor 28. It is sectionalized so that it radial outer sections may pass upwardly between the individual runs 45 of the conveyor 28. As its outer section moves upwardly between the belts, it engages the leading edge of the untopped row 34a of cookies and lifts the leading edge upwardly onto the lower edge of the guide cam 44. Pins 46 of the pinwheel 43 then engage the trailing edge of the untopped rows of cookies and push those trailing edges upwardly, thereby forcing the cookies to follow the generally arcuate contour or cam surface 47 of the cam plate 44.

The cam plate 44 is made up from a series of individual plates such that the pins 46 of the pinwheel 43 may pass between the individual plates. The untopped cookies are then conveyed upwardly on the pins 46 of the pinwheel 43 until what had been the top surface of the untopped cookies rests against the circumference 48 of the pinwheel 43. When the cookies reach the top of the pinwheel, they are inverted. Upon continued movement of the cookies past the top of the pinwheel, the cookies move onto a downwardly and rearwardly inclined plate 52, the forwardmost end 53 of which rests immediately against the circumference 48 of the pinwheel. The plate is also made up of a series of parallel individual plates spaced apart so that the pins 46 of the pinwheel 43 may pass between them. After being placed upon the plate 52, the untopped cookies are moved rearwardly on the plate by pusher lugs 54 of the return conveyor 38. At the upstream end of the return conveyor 38, the rows of untopped cookies are pushed off, one row at a time, onto the top of a deadplate 55. This plate holds a row of untopped cookies in a ready position above the cookies on the main conveyor 28 until a row 34b of topped cookies arrives beneath the upstream edge of the deadplate and beneath the row 34a of cookies resting on the deadplate 55. When this occurs, a pusher finger 56 of a synchronizing pusher conveyor 57 moving at a slightly greater speed than that of the belts 29 of the main conveyor 28, moves up behind the row 34b of topped cookies located beneath the deadplate 55 engaging the trailing edge of the row of topped cookies and simultaneously the trailing edge of the row 34a of untopped inverted cookies on the deadplate 55. The pusher finger 56 of the synchronizing conveyor 57 then moves forwardly simultaneously pushing the row 34b of topped cookies and the row 34a of untopped cookies on the deadplate 55 forwardly until the row of untopped cookies moves off of the forward edge of the deadplate onto the top of the row 34b of topped cookies as that row moves out from beneath the deadplate 55. The two rows thus come together "on the fly" during movement of both rows moving in synchronization as a consequence of the pusher finger 56 determining the rate of movement of both rows, one beneath and one above the deadplate 55. Consequently, the two rows make perfect rows of matched sandwich cookies without any chance for misalignment of the two rows.

Once the row 34b of topped cookies has been covered by a second row 34a of inverted and untopped cookies at the layering station 37, the row of sandwich products continues to move forwardly on the main conveyor 28 past the lifter cam 42 and the pinwheel 43 without having its forward movement disturbed be either of those elements 42, 43. It then passes beneath a reciprocating presser plate 62 which is lowered into contact with the row of sandwiches as the row of sandwiches passes on the conveyor 28 beneath the presser plate. The presser plate is operative to size the thickness of the final sandwich products which then pass out of the machine onto another outfeed conveyor.

The magazines 26 are conventional bottom feed magazines wherein the cookies within the magazines feed by gravity downwardly to the open bottom of the magazine. The upper end of the magazine preferably slopes toward the shingling conveyor 13 so that there is a minimal free-fall distance available for the cookies to fall downwardly after being fed from the shingling conveyor 13 into the upper open end 63 of the magazine. The slope of the upper end of the magazine is such that the cookies will freely feed through it, but it is not so great that the cookies in the course of passage through the upper sloping end will gain speed and fall with excessive force to the bottom of the magazine.

The lowermost cookie in each magazine 26 is supported upon the top of a feed roller 27 located beneath each magazine 26. As explained more fully hereinafter, lifter fingers 64 are operative to lift the stack of cookies contained in a magazine after each cookie is fed from a magazine and then to lower the lowermost cookie back out the top of a feed wheel 27.

MAGAZINE FEED

Cookies are fed from the bottom of the magazines 26 by the feed wheels 27. There is a feed wheel 27 located beneath each magazine 26. The feed wheels are mounted upon a shaft 65 which extends between and is supported from the side plates 66, 67 of the machine 12. The shaft 65 and wheel 27 are driven from the main timer shaft of the machine through conventional pulley and belt drives.

The radial edge of each feed wheel 27 extends upwardly between the pair of spaced belts 29 which define each line or column of the conveyor 28. Each wheel has on its periphery several equidistantly spaced notches or recesses 68. These recesses are generally wedge-shaped and have a shoulder 69 at the trailing end of the recess engageable with the trailing edge of the lowermost cookie in a magazine 26. As viewed in FIG. 1, the feed wheels 27 rotate counterclockwise so that the trailing edge 69 of the recess 68 engages the trailing edge of a cookie supported by the peripheral surface of the wheel 27.

Cooperable with each feed wheel 27 there is a pair of lifter fingers 64 which extend beneath the magazine 26. Each pair of lifter fingers 64 is interconnected by a supporting bar 72 from which the fingers extend forwardly. Extending rearwardly from the bar 72 there is a lifter finger actuating lever 73 which rests against and is supported by the peripheral surface of an eccentric cam 74 mounted upon a cam shaft 75. The cam shaft 75 is supported between the frame side plates 66, 67 and is driven in rotation by a pulley and belt drive interconnected to the main drive shaft of the machine by conventional belt and pulley connections. Consequently, rotation of the shaft 75 and attached eccentric cams 74 is synchronized with rotation of the feed wheels 27. In practice, the two shafts 65 and 75 are synchronized so that the eccentrics 74 move the lever arms 73 downwardly to lift a stack of cookies contained in the magazine 26 upwardly above the horizontal plane of the top edge of the wheels after each cookie is fed from the magazine. Consequently, if there are ten recesses 68 in the feed wheel 27 the eccentric cam shaft 75 will make ten revolutions for every one revolution of the feed wheel 27 so that the stack of cookies is lifted above the level of the feed wheel and then lowered into engagement with a notch 68 after each cookie is fed from the magazine 26.

The rear end of the lever 73 extends beneath a control switch 76. This switch 76 is supported by any means not shown so that its actuator is engageable with the lever 73. This switch in turn may be used to electrically control operation of the lifter fingers 64 so as to cause them to be held in a raised position with the cookies out of vertical alignment with the feed wheels 29 so as to enable the feed wheels to rotate without feeding cookies from the magazine onto the conveyor 28. This switch 76 and associated control circuitry may be activated intermittently so as to deposit cookies from the magazine into alternate ones of the recesses 68 in the feed wheel. This latter type of feed would be utilized for example to feed the untopped cookie rows 34a into the inverting and layering conveyor 39 upon the start-up of the machine. Alternatively, the control switch 76 and associated control circuitry could be utilized to hold the fingers in a raised position so as to prevent infeed of cookies into the machine if it were desired to empty the machine of cookies, as for example, at the end of a work shift.

MAIN CONVEYOR

As mentioned hereinabove, the main conveyor 28 comprises a plurality of parallel belts or tubes 29 which extend between the drive roller 32 and the idler roller 33. These rollers are in turn supported on the machine frame side plates 66, 67. In the preferred embodiment, a pair of individual belts 29 spaced apart approximately one inch but greater or less distance depending upon the size of cookies to be supported by the belts, define a single conveyor line for supporting a column of cookies 34 as the cookies pass through the machine.

The conveyor 28 is driven from the drive roller 32 which in turn is driven by conventional means (not shown) from a main drive motor (not shown) of the machine. This motor effects continuous drive to the drive roller 32 and hence the conveyor 28. So long as the motor (not shown) is operating, the drive roller 32 continues to rotate and thereby effect continuous movement of the main conveyor 28.

TOPPING MECHANISM

The topping mechanism 35 is a conventional topping head such as disclosed in my U.S. Pat. No. 3,783,772. This head moves back and forth parallel with movement of the conveyor 28 and in synchronization with movement of alternate rows 34 of cookies beneath the head. While it is moving forwardly with the conveyor and over the top of a row of cookies, a valve (not shown) in the head opens to dispense the topping material (as for example, peanut butter or marshmallow topping) onto the row of cookies located beneath it. Simultaneously with the forward movement of the head, it is lifted upwardly away from the cakes so that it moves upwardly as the deposit grows in thickness on top of the cakes. At the forward end of its travel the valve of the head is closed and the head is returned back upstream and lowered to a position preparatory to the passage of the next alternate row of cookies beneath it. The head is elevated or moved upwardly away from the cookies prior to being returned upstream to disengage the stream of topping material ejected from the nozzles of the head from the cookies and prevent the stream from dripping out over the rear edges of the cookies.

The mechanism for supporting the topping head 25 and controlling both its horizonal and vertical movements may be identical to that disclosed in my U.S. Pat. No. 3,783,772. Alternatively, movement of the head 36 may be controlled by continuously rotating cams. In either event, the topping head drive mechanism is synchronized with the movement of the cookies beneath the topping head 36 as a consequence of both the topping head drive mechanism and the conveyor 28 being driven from the main drive shaft of the machine and thus synchronized with the feed of cookies from the magazine.

After the iced row of cakes has passed from the icing station 35, it passes beneath a roller 77. This roller is constantly driven in rotation from the main drive shaft by a belt or suitable means (not shown). In a preferred embodiment, this roller is cloth-covered and is maintained in a wet condition so as to prevent the topping material from sticking to it. It is operative to iron out the icing and spread it evenly over the surface of the cookies or cakes as they pass beneath it.

INVERTING HEAD AND RETURN MECHANISM

The alternate rows of cakes 34a to which no icing is applied as they pass beneath the icing head 36 continue to move forwardly on the main conveyor 28 without having anything done to them and without having their forward movement interrupted until they pass over the lifter cam 42. The lifter cam, which is eccentrically mounted upon a drive shaft 82, is intermittently moved up between the belts 29 of the conveyor 28 to engage the leading edge of the row of untopped cakes simultaneous with the arrival of the row on the cam. Upon continued rotation of eccentric cam 42, it lifts the leading edges up to and above the horizontal plane of the lower edge 83 of the cam 44 and into engagement with the arcuate cam surface 47. Simultaneously with this upward lifting of the leading edge of the untopped cakes by the cam 42, the trailing edge of a row 34a of cakes is engaged by pins 46 which extend radially from the pinwheel 43. Continued rotation of these pins 46 push the row 34a of cakes upwardly over the surface 47 of the cam plate 44 until, when it reaches the upper edge of the cam surface, the cake is inverted and in a position in which what had formly been the top surface of the cake is contacting the surface 48 of the pinwheel. By the time the cake is pushed upwardly over the top of the wheel, it is completely inverted and in this inverted position is pushed off the pinwheel onto the slide 52. The forward end 53 of the slide 52 is slotted so that the pins 46 of the pinwheel 43 pass through the slots. Upon being pushed off the pinwheel onto the slide plate 52, the trailing edges of the cakes are engaged by the lugs 54 of the intermittently-movable return conveyor 38. As may be seen most clearly in FIG. 1, these pins pick up the row of cakes as they come off the pinwheel onto the slide 52 and then continue to push the cakes upstream over the slide 52.

The lugs 54 of the conveyor 38 are mounted upon bars of the conveyor 38. The bars in turn are supported at their opposite ends upon chains 84 which are movable over a drive sprocket 85 at the forward end and an idler sprocket 86 at the rear. The drive sprocket 85 is driven by a drive belt or suitable means (not shown) from the drive shaft 82 of the lifter cam 42. This same drive belt also drives the pinwheel 43 so that the pinwheel and conveyor 38 all move in synchronization with the rotation of the lifter cam 42. The lifter cam drive shaft 82 is in turn driven by a belt or suitable means (not shown) via suitable gearing (not shown) from the main drive shaft (not shown). This main drive shaft is driven continuously, and the timing is such that each time a row of untopped cookies reaches the lifter cam 42, the lifter cam 42 goes through one revolution. In one rotation of the cam shaft 82, the pinwheel 43 rotates through a circumferential distance of approximately 1½ cookies diameter and the conveyor 38 moves upstream a distance of approximately one cookie diameter.

LAYERING STATION

The timing of the conveyor 38 is such that each time a row 34b of topped cakes moves beneath the deadplate 55, the conveyor 38 is operative to deposit one row 34a of cakes off the upstream end of the slide 52 and onto the stationary deadplate 55. As explained hereinabove, this deadplate 55 is made from multiple sections. Each of the multiple sections of the deadplate 55 is suspended from the deadplate 52 by blocks 87. A row of cookies then rests upon this plate 55 until a row 34b of topped cakes passes beneath it. When a row of topped cakes arrives beneath a row 34a of untopped cookies resting upon the deadplate 55, a pusher finger 56 of the synchronizing pusher conveyor 57 traveling at a speed slightly greater than that of the main conveyor 28 engages the trailing edge of a row of cookies 34a supported upon the deadplate 55 and the trailing edge of a row 34b of topped cookies located immediately beneath that row 34a. This pusher then moves both rows 34a, 34b of cookies forwardly at a rate slightly greater than the speed of the conveyor 28 until the topmost layer moves off of the forwardmost or downstream end of the deadplate 55 and falls onto the top of the topped layer 34b located immediately therebeneath.

The pusher 56 is mounted upon a pivoted weighted lug 88 attached to an endless chain 89 of the synchronizing pusher conveyor 57. This chain is movable over a driven sprocket at the forward end of the conveyor 57 and over an idler sprocket at the trailing end. The driven sprocket of the conveyor 57 is driven from the main drive shaft of the machine so that the speed of the synchronizing pusher conveyor is synchronized with the speed of the main conveyor 28 driven from this same drive shaft.

As mentioned hereinabove, each pusher 56 is mounted upon a pivoted weighted lug 88. After the pusher finger 56 has moved past the deadplate 55, it is disengaged from the cookies which it had previously pushed off of the deadplate as a consequence of its engagement with a hold-down bar 92. Movement of the pusher finger 56 past this stationary bar 92 causes the finger to be moved downwardly into a position in which the finger extends parallel to the top run of the chain 89 of the conveyor 57. The pusher finger then remains in this position until the pusher finger passes around the idler sprocket of the conveyor 57. At that point the lug 88 engages a lifter cam 93 which causes the lug 88 and attached finger 56 to be raised or lifted upwardly to the position of the trailing finger illustrated in FIG. 1. The raised lug and attached lifter finger is then held in this position as the lug moves over the surface of a stationary lifter bar 94 which then maintains the finger in this upraised position while it moves past the deadplate 55 and pushes a row 34a of untopped cookies from the deadplate 55 onto a lower row of topped cookies 34a.

After having been capped with a row of inverted untopped cookies 34a, the completed sandwich row 34c continues to move forwardly on the main conveyor 28 past the pinwheel 43 and the lifter 42 without any contact of either the fingers of the pinwheel or the lifter with the completed sandwiches 34c.

PRESS DOWN SIZER

Located downstream from the pinwheel 43 and above the downstream end of the conveyor 28, the reciprocating sizer 62 is lowered into engagement with a row 34c of completed sandwiches before those sandwiches pass out of the machine 12. This sizer comprises a weighted plate suspended from a supporting post 95, the upper end of which is attached to a cross bar 96. The lower side of the cross bar 96 is engageable by a pin 97 of a rocker bar 98. This rocker bar is pivotally supported from a supporting shaft 99 such that the bar is free to oscillate as indicated by the arrow 102. The lower surface of this rocker bar 98 is engageable by an eccentrically-mounted cam which effects oscillation of the rocker bar 98. This cam is mounted upon a shaft which is driven in rotation from the main drive shaft of the machine through a series of belts and pulleys such that rotation of the eccentric is synchronized with movement of the main conveyor 28. Each time that a row 34c of sandwiches passes beneath the presser plate 62, the plate is lowered by the weight of the plate into engagement with the top of the row 34c of completed cookies. This results in the height of the cookie being determined by the lower limit of the bottom surface of the presser plate 52. The presser plate is then lifted preparatory to arrival of the next row 34c of sandwiches beneath the plate.

TRANSVERSE WASTE TAKE-OFF BELT

Every once in awhile and for a myriad of reasons, voids occur in a row of cookies or in a missing row of cookies passing beneath the topping dispenser head 36. When that occurs, the dispenser may be opened so as to dispense topping material, but in the absence of a cookie beneath that head, the topping material will be dispensed onto the conveyor or, if as here where the conveyor is open, onto the bed of the machine or the floor located beneath the dispensing head. There is usually a bucket or some type of reservoir located beneath the dispenser to catch such waste topping material. In this machine, though, there is provided a transverse waste take-off belt 103 located beneath the dispenser head 36. This belt 103 is operative to convey any waste material dispensed onto it to a waste material reservoir. In the preferred embodiment, this take-off belt 103 is an endless belt having a Teflon or other slip type top surface. The top run of the belt 103 is located beneath the dispenser head 36 and between the upper and lower runs of the main conveyor 28. The lower run is located beneath the lower run 104 of the main conveyor 28. This belt 103 is movable over a drive pulley at one side of the machine and an idler pulley at the other end. The drive pulley may be driven from the main drive shaft of the machine or may be independently driven, since there is no requirement that it be synchronized with the conveyor movement of the machine. One end of this belt is engageable with a scraper 105 located above a waste material reservoir 106. When the belt 103 is driven from the main drive pulley, any waste material located on the top of the belt is scraped from it and falls into the waste material reservoir 151.

OPERATION

When cakes or cookies are fed into the machine 12 on a conveyor from the oven 10, the cookies are generally arranged in columns and in rows. The rows are generally imperfectly aligned, but the result is that the same number of cookies are contained in each column arriving at the machine although the spacing may be imperfect. This spacing though is of no consequence when the cookies are subsequently fed into the magazines 26.

Preferably, before the cookies arrive at the magazine 26, they pass through a two stage cooling system 14 while supported upon a shingling conveyor 13. This shingling conveyor then supplies each column of cookies to one of a row of magazines 26, the bottoms of which are open to rotary feed wheels 27. The cookies are fed from the bottoms of these magazines 26 by the feed wheels 27 as a consequence of radial notches in the feed wheels engaging and pushing the lowermost cookies from the magazines. Cooperable with the feed wheel there are lifter fingers which lift the stack of cookies contained in the magazine above the level of the wheel after each cookie is removed from the magazine. If it becomes necessary or desirable to withhold the feed of cookies into the machine while the machine continues to cycle, the lifter finger control switch 76 is activated to raise the fingers 64 and thereby the feed of cookies through the machine is temporarily halted. Alternatively, the switch 76 may be cycled so as to feed alternate rows of cookies into the machine. This alternate cycling, for example, may be desirable at start-up so as to load the downstream conveyor 28 with untopped and inverted rows of cookies preparatory to start-up of the machine.

The cookies fed from the magazines 26 are deposited onto a continuously-moving main conveyor 28 of the machine. This conveyor then transports the rows of cookies from the feed magazines 26 through the machine 12.

As each alternate row 34 of cookies passes beneath the icing head 36 at the topping station 35, forward and upward movement of the head is initiated and simultaneously a control valve, as, for example, a conventional sliding valve (not shown), in the head 36 is opened so that topping is ejected onto each cake in the row 34b. At the end of the forward stroke of the icing head, the valve of the head is closed and the head is returned upstream and lowered to its starting position preparatory to the arrival of the next following row of cakes beneath the head.

The alternate rows 34a of cakes pass the topping station without having any topping applied thereto. These alternate rows continue to move forwardly on the conveyor 28 until they move over the lifting cam 42. Simultaneously with the arrival of a row of untopped cakes or cookies over the lifter cam, the cam 42 is cycled through one revolution. Simultaneously, the pinwheel 43 is rotated to engage and lift the row 34a of cakes up over a guide surface 47 of the cam plate 44 and deposit the row 34a of cakes onto a slide plate 52 of the return conveyor 38. The return conveyor 38 then pushes a row 34a of cakes from the upstream end of the plate 52 onto the deadplate 55.

In the course of rotating through one revolution, the lifter or diverter cam 42 lifts the leading edge of the row 34a of cakes located above it upwardly into and above the horizontal plane of the bottom edge 83 of the cam 44. Simultaneously, the pins 46 of the pinwheel 43 engage the trailing edge of the cakes and cause the row to move upwardly off the conveyor 28 over the guide surface 47 of the guide plate.

Upon continued motion of the pinwheel 43, the cakes continue to move upwardly, are inverted and then placed on the forward end of the slide 52. The lugs 54 on the return conveyor 38 then engage the rear edge of the cakes on the plate 52 and push those rows upstream onto the deadplate 55.

As a topped row 34b of cakes moves forwardly beneath the deadplate 55, a pusher finger 56 engages the rear edge of that row 34b of topped cakes and simultaneously engages the trailing edge of a row of cakes 34a located immediately above that topped row. The pusher pin then is operative to push both rows 34 through the deadplate until the top row 34a falls off of the deadplate onto the lower topped row 34b. Thereafter, the finger 56 engages the stop bar 92 and is caused to swing down out of the plane of the topped sandwich 34c. It then remains in this lowered position until the lug 88 of the attached pusher finger 56 engages the cam 93 and hold-down plate 94 of the synchronizing pusher conveyor 57.

The completed sandwich 34c continues to move forwardly on the conveyor 28 beneath the pinwheel 43 without the pins 46 of the pinwheel contacting the sandwich. The row 34c of sandwiches then pases beneath the presser bar 62 which is lowered into contact with the sandwich so as to properly size it before passage from the downstream end of the machine.

Figure 5:
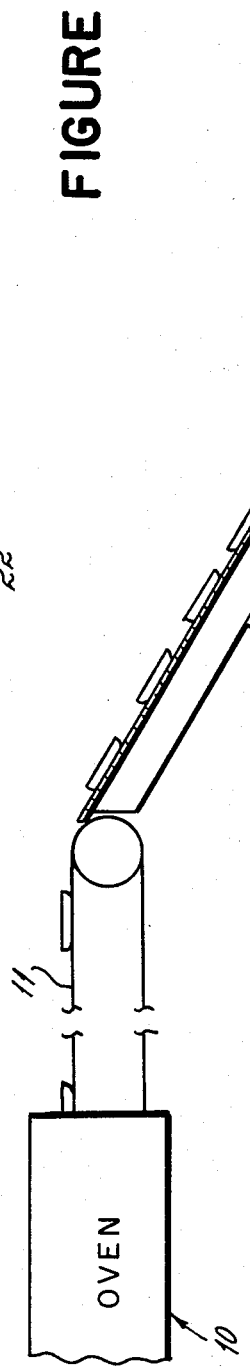
FIG. 5 is a diagrammatic view of an alternative cookie shingling apparatus for a cookie sandwich machine.

With reference to FIG. 5, there is illustrated an alternative feed system for convey cookies from the oven 10 and for shingling and stacking those cookies within the magazine 126. As in the embodiments of FIGS. 1–4, cookies are conveyed in aligned rows and columns from the oven 10 upon the conveyor 11. In this embodiment, cookies from the oven conveyor 11 are fed onto a vibrating feed plate 127 which slopes generally at an angle of approximately 30° to a horizontal plane. As a consequence of the vibration of this plate 127, which may be effected by a vibratory motor 128, the cookies move downwardly over the plate until the leading edge of the forwardmost cookie on the plate contacts the trailing edge of the last cookied 129 in a prime of cookies 130 which are stacked, shingled and contained in the magazine 126 and then backed up from it onto the plate 127. As the leading edge of the leading unshingled cookie 131 on the plate moves into contact with the last shingled cookie 129 in the prime 130 of shingled cookies, it crawls upwardly over the trailing edge of the last cookie in the shingled prime so as to effect shingling of that leading cookie 131 onto the top of the trailing edge of the trailing cookie 129 in prime 130.

It has been found that this technique for shingling the cookies immediately prior to this entering the vertical stack contained in the magazine 126 is periodically subject to the leading edge of one cookie, as, for example, cookie 131 moving beneath the trailing edge of the last shingled cookie 129 in the bank of shingled cookies on the plate 127. When this occurs, it has the effect of causing the improperly shingled cookies and all following cookies to turn over onto an unside-down orientation in the shingled stack. To counter this tendency for one cookie to pass beneath rather than on top of the cookie in the shingled stack, the lower end of the plate 127 has a sinusoidal wave form formed thereon. In practice, this wave form is only approximately ⅛ inch in height and has a pitch P slightly less than the diameter of one cookie supported upon the plate. The presence of the sinusoidal wave form on the lower end of the vibrating plate prevents the cookie from shingling beneath the last shingled cookie in the bank and insures that all of the cookies are properly shingled with the leading edge of one cookie moved onto the top trailing edge of the cookie immediately preceding it.

If so desired, the shingled cookies on the conveyor plate 127 may be passed through cooling tunnels as in the embodiments of FIGS. 1–4. For the sake of simplification those cooling tunnels have been omitted from this embodiment. From the magazine 126 cookies are fed into the machine 12 in the same manner and by the same mechanism as in the modification of FIGS. 1–4. Thus, from the magazine 126 forwardly the sandwich machine of FIG. 5 is identical to the embodiment illustrated in FIGS. 1–4.

The sandwich machine 12 of this invention has numerous advantages over the machine described in the above identified U.S. Pat. No. 3,783,772 upon which it is an improvement. Specifically, the magazine feed of this invention enables the machine to accept misaligned rows of products through a sandwich machine without the need for the complex control circuit disclosed in the above identified patent. This has the advantage of reducing the cost of the machine and increasing its reliability. Additionally, because the cookies or cakes or baked products are passed through the cooling tunnel and refrigerated before they are supplied to the magazine, very soft fragile products may be processed in this machine even through such products have heretofore never been capable of being layered and handled in an automatic sandwich machine without substantial manual handling between the oven and the machine. Additionally, this machine has the capability of creating more perfectly aligned products than the machine described in the above identified patent. Furthermore, because the machine eliminates many reciprocable parts and utilizes instead continuously operable rotating parts, this machine may be operated at much higher speeds than the machine described in the above identified patent.

The shingling conveyor of FIG. 5 has the advantage of an inexpensive feed conveyor which effectively shingles cakes or cookies fed over the conveyor without any of the shingled products being interleaved beneath rather than above the preceding cake or cookies in the shingled stack. If shingled beneath the preceding cake or cookies, the mis-shingled cake or cookie causes the row of shingled products behind the mis-shingled one to turn over onto an upside down orientation on the shingling conveyor. The provision of a sinusoidal wave shaped form on the portion of vibratory feed conveyor over which the cakes or cookies are shingled has been found to eliminate this problem.

While I have described only two preferred embodiments of my invention, persons skilled in this art will appreciate numerous changes and modifications which may be made without departing from the spirit of my invention. Therefore, I do not intend to be limited except by the scope of the following appended claims.

I claim:

1. A sandwich making machine for automatically making a sandwich having a topping material located between two individual objects, said machine comprising,
    a row of magazine means for receiving rows of objects,
    feeding means for feeding aligned rows of said objects from said magazine means into said machine,
    first conveyor means for transporting said aligned rows of objects in a forward direction through said machine,
    topping applicator means located in the path of travel of said conveyor for applying topping to rows of said objects,
    a sandwich layering station located downstream of said topping applicator means,
    second conveyor means for transporting untopped rows of objects to said sandwich layering station, layering means at said sandwich station for placing rows of untopped objects from said second conveyor means on the tops of rows of topped objects passing said sandwich layering station, said first conveyor means comprising multiple spaced endless conveyor belts, each of said objects in each of said rows being supported by a spaced pair of said belts, and a topping takeoff conveyor belt located beneath said first conveyor means and beneath said topping applicator means, said topping takeoff conveyor belt being movable in a direction normal to the path of movement of said first conveyor means and being operable to receive and transport out of the machine any waste topping material deposited between the spaced belts as a result of the absence of an object on the first conveyor beneath said topping applicator means when said topping applicator means dispenses topping material.

2. The machine of claim 1 which further includes a waste topping reservoir located ot one end of said waste topping conveyor belt and means for scraping waste topping material from said belt into said waste topping reservoir.

3. A sandwich making machine for automatically making a sandwich having a topping material located between two individual objects, said machine comprising, a row of magazine means for receiving rows of objects, feeding means including rotary feed wheels for feeding aligned rows of said objects from said magazine means into said machine, first conveyor means for transporting said aligned rows of objects in a forward direction through said machine, topping applicator means located in the path of travel of said conveyor for applying topping to alternate rows of said objects, a sandwich layering station located downstream of said topping applicator means, second conveyor means for transporting untopped rows of objects to said sandwich layering station after said objects have passed said topping applicator means, layering means at said sandwich layering station for placing rows of untopped objects from said second conveyor means on the tops of rows of topped objects, passing said sandwich layering station, said first conveyor means being a continuously moving conveyor and said layering means comprising a deadplate for receiving a row of objects and an endless conveyorized pusher means simultaneously engageable with a row of topped objects and a row of untopped objects on said pusher plate for simultaneously pushing a row of objects off of said deadplate onto a row of topped objects being pushed downstream by said conveyorized pusher means.

4. A sandwich making machine for automatically making a sandwich having a topping material located between two individual objects, said machine comprising, a row of magazine means for receiving rows of objects, feeding means for feeding aligned rows of said objects from said magazine means into said machine, first conveyor means for transporting said aligned rows of objects in a forward direction through said machine, topping applicator means located in the path of travel of said conveyor for applying topping to rows of said objects, a sandwich layering station located downstream of said topping applicator means, second conveyor means for transporting untopped rows of objects to said sandwich layering station, layering means at said sandwich layering station for placing rows of untopped objects from said second conveyor means on the tops of rows of topped objects passing said sandwich layering station, third conveyor means for supplying rows of dough products from an oven to said row of magazine means, and cooling system means for cooling said bakery dough products below ambient temperature, said third conveyor means passing through said cooling system means whereby said dough products are cooled and rigidified by passage through said cooling system means before being supplied to said row of magazine means.

5. The machine of claim 4 which further includes means for shingling said rows of dough products on said third conveyor means before passage through said cooling system means.

6. A sandwich making machine for automatically making a sandwich having a topping material located between two individual objects, said machine comprising, a row of magazine means for receiving rows of objects, feeding means for feeding aligned rows of said objects from said magazine means into said machine, first conveyor means for transporting said aligned rows of objects in a forward direction through said machine, topping applicator means located in the path of travel of said first conveyor means for applying topping to rows of said objects, a sandwich layering station located downstream of said topping applicator means, second conveyor means for transporting untopped rows of objects to said sandwich layering station, layering means at said sandwich station for placing rows of untopped objects from said second conveyor means on the tops of rows of topped objects passing said sandwich layering station, said row of magazine means comprising a row of feeder magazines, each of said feeder magazines having a bottom feed opening, pusher means for engaging and feeding the lowermost object in a magazine from the magazine onto said first conveyor means, lifter means associated with each feeder magazine, and means for actuating said lifter means to engage the lowermost object in a feeder magazine and lift the lowermost object in said magazine out of vertical alignment with said pusher means.

7. The machine of claim 6 wherein said pusher means comprises a rotary feed wheel having radial projections thereon engageable with the lowermost object in said magazine.

8. The machine of claim 7 wherein said actuating means includes a rotatable cam engageable with said lifter means.

9. A sandwich making machine for automatically making a sandwich having a topping material located between two individual objects, said machine comprising,
- a row of magazine means for receiving rows of objects,
- feeding means for feeding aligned rows of said objects from said magazine means into said machine,
- first conveyor means for transporting said aligned rows of objects in a forward direction through said machine,
- topping applicator means located in the path of travel of said first conveyor means for applying topping to rows of said objects,
- a sandwich layering station located downstream of said topping applicator means,
- second conveyor means for transporting untopped rows of objects to said sandwich layering station,
- layering means at said sandwich layering station for placing rows of untopped objects from said second conveyor means on the tops of rows of topped objects passing said sandwich layering station, and
- means for compressing said topped objects, said compressing means being located downstream of said sandwich layering station and comprising a reciprocable presser plate engageable with the top surface of each topped object passing said presser plate.

10. The machine of claim 9 wherein the weight of said presser plate determines the force applied by said presser plate to said topped object, said presser plate being reciprocated by a lifter means operable to lift said presser plate off of topped objects and to permit said presser plate to be lowered by gravity onto the tops of topped objects.

11. A sandwich making machine for automatically making a sandwich having a topping material located between two individual objects, said machine comprising,
- a row of magazine means for receiving rows of objects,
- feeding means including rotary feed wheels for feeding aligned rows of said objects from said magazine means into said machine,
- first conveyor means for transporting said aligned rows of objects in a forward direction through said machine,
- topping applicator means located in the path of travel of said conveyor for applying topping to alternate rows of said objects,
- a sandwich layering station located downstream of said topping applicator means,
- inverting means for inverting untopped rows of said objects after said objects have passed said topping applicator means,
- second conveyor means for transporting untopped rows of objects to said sandwich layering station and,
- layering means at said sandwich station for placing rows of untopped objects from said second conveyor means on the tops of rows of topped objects passing said sandwich layering station.

12. A sandwich making machine for automatically making a sandwich having a topping material located between two individual objects, said machine comprising,
- a row of magazine means for receiving rows of objects,
- feeding means including rotary feed wheels for feeding aligned rows of said objects from said magazine means into said machine,
- first conveyor means for transporting said aligned rows of objects in a forward direction through said machine,
- topping applicator means located in the path of travel of said conveyor for applying topping to alternate rows of said objects,
- a sandwich layering station located downstream of said topping applicator means,
- pickup and inverting means located downstream of said layering station for picking up and inverting alternate untopped rows of said objects,
- second conveyor means located above said first conveyor means for transporting inverted untopped rows of objects from said pickup and inverting means back upstream to said sandwich layering station and,
- layering means at said sandwich station for placing rows of inverted untopped objects from said second conveyor means on the tops of alternate topped rows of objects passing said sandwich layering station.

13. The machine of claim 12 wherein said first conveyor means comprises multiple spaced endless conveyor belts, each of said objects in each of said rows being supported by a spaced pair of said belts, and
- a topping takeoff conveyor belt located beneath said first conveyor means and beneath said topping applicator means, said topping takeoff conveyor belt being movable in a direction normal to the path of movement of said first conveyor means and being operable to receive and transport out of the machine any waste topping material deposited between the spaced belts as a result of the absence of an object on the first conveyor beneath said topping applicator means when said topping applicator means dispenses topping material.

14. The machine of claim 13 which further includes a waste topping reservoir located at one end of said waste topping conveyor belt and means for scraping waste topping material from said belt into said waste topping reservoir.

15. The machine of claim 12 in which said first conveyor means is a continuously moving conveyor and in which,
- said layering means comprises a deadplate for receiving a row of objects and a conveyorized pusher means simultaneously engageable with a row of topped objects and a row of untopped objects on said pusher plate for simultaneously pushing a row of objects off of said deadplate onto a row of topped objects being pushed downstream by said conveyorized pusher means.

16. The machine of claim 12 wherein said objects comprise bakery dough products, said machine further comprising,
- third conveyor means for supplying rows of dough products from an oven to said row of magazine means, and
- cooling system means for cooling said dough products below ambient temperature, said third conveyor means passing through said cooling system means whereby said dough products are cooled and rigidified by passage through said cooling system means before being supplied to said row of magazine means.

17. The magazine of claim 16 which further includes means for shingling said rows of dough products on said third conveyor means before passage through said cooling system means.

18. The machine of claim 12 wherein said row of magazine means comprises a row of feeder magazines, each of said feeder magazines having a bottom feed opening,
pusher means for engaging and feeding the lowermost object in a magazine from the magazine onto said first conveyor means,
lifter means associated with each feeder magazine, and
means for actuating said lifter means to engage the bottommost object in a feeder magazine and lift the lowermost object in said magazine out of vertical alignment with said pusher means after each object is removed from said feeder magazine.

19. The machine of claim 18 wherein said pusher means comprises a rotary feed wheel having radial projections thereon engageable with the lowermost object in said magazine.

20. The machine of claim 19 wherein said actuating means includes a rotatable cam engageable with said lifter means.

21. The machine of claim 12 which further includes means for compressing said topped objects, said compressing means being located downstream of said sandwich station and comprising a reciprocable presser plate engageable with the top surface of each topped object passing said presser plate.

22. The machine of claim 21 wherein the weight of said presser plate determines the force applied by said presser plate to said topped object, said presser plate being reciprocated by a lifter means operable to lift said presser plate off of topped objects and to permit said presser plate to be lowered by gravity onto the tops of topped objects.

23. A sandwich making machine for automatically making a sandwich having a topping material located between two individual bakery dough products, said machine comprising,
feeding means for feeding aligned rows of products into said machine,
first conveyor means for transporting said aligned rows of products in a forward direction through said machine,
topping applicator means located in the path of travel of said conveyor for applying topping to rows of said products,
a sandwich layering station located downstream of said topping applicator means,
second conveyor means for transporting untopped rows of products to said sandwich layering station,
layering means at said sandwich station for placing rows of untopped products from said second conveyor means on the tops of rows of topped products passing through said sandwich layering station,
third conveyor means for supplying rows of dough products from an oven to said row of magazine means, and
cooling system means for cooling said dough products below ambient temperature, said third conveyor means passing through said cooling system means whereby said dough products are cooled and rigidified by passage through said cooling system means before being supplied to said row of magazine means.

24. The machine of claim 23 which further includes means for shingling said rows of dough products on said third conveyor means before passage through said cooling system means.

25. The machine of claim 23 wherein said third conveyor means is an open mesh conveyor through which air is moved to cool said bakery dough products.

26. The machine of claim 25 wherein said cooling system means comprises two stages, the first stage being operable to move ambient temperature air over said bakery dough products to partially cool said bakery dough products and the second stage being operable to move refrigerated air over said bakery dough products to further cool said products.

27. The machine of claim 26 wherein said first stage of said cooling system means comprises a plenum located beneath said third conveyor means and a fan for moving air downwardly through said bakery dough products into said plenum.

28. The machine of claim 27 wherein said second stage of said cooling system comprises a first plenum located above said third conveyor means, and means for circulating refrigerated air between said first and second plenum to cool said bakery dough products.

* * * * *

UNITED STATES PATENT AND TRADEMARK OFFICE
CERTIFICATE OF CORRECTION

PATENT NO. : 4,513,656
DATED : April 30, 1985
INVENTOR(S) : Rudolph J. Fay

It is certified that error appears in the above-identified patent and that said Letters Patent is hereby corrected as shown below:

```
Column 11, line 20, "52" should be -- 62 --
Column 13, line 32, "cookied" should be -- cookie --
Column 13, line 50, "unside" should be -- upside --
```

Signed and Sealed this

Seventeenth Day of September 1985

[SEAL]

*Attest:*

*Attesting Officer*

DONALD J. QUIGG

*Commissioner of Patents and Trademarks—Designate*